United States Patent [19]

Murray et al.

[11] Patent Number: 4,947,350
[45] Date of Patent: Aug. 7, 1990

[54] TACTICAL ROUTING SYSTEM AND METHOD

[75] Inventors: Declan G. Murray; John H. Powell, both of Preston, England

[73] Assignee: British Aerospace Public Limited Company, London, England

[21] Appl. No.: 443,861

[22] Filed: Nov. 30, 1989

Related U.S. Application Data

[63] Continuation of Ser. No. 193,223, May 11, 1988, abandoned, which is a continuation of Ser. No. 846,078, Mar. 31, 1986, abandoned.

[30] Foreign Application Priority Data

Apr. 1, 1985 [GB] United Kingdom ................. 8508489

[51] Int. Cl.$^5$ ............................................. G06F 15/50
[52] U.S. Cl. .................................... 364/554; 364/461; 235/412
[58] Field of Search ............... 364/554, 439, 443, 461, 364/462; 235/400, 404, 412; 244/3.15, 3.17, 3.19, 3.2, 3.22; 89/1.1; 434/11, 14, 43; 342/62, 63, 65

[56] References Cited

U.S. PATENT DOCUMENTS

| | | | |
|---|---|---|---|
| 3,088,107 | 4/1963 | Martienssen et al. | 364/439 |
| 3,108,182 | 10/1963 | Gray | 342/63 |
| 3,213,447 | 10/1965 | Burrows et al. | 342/65 |
| 3,377,471 | 4/1968 | Althaus et al. | 364/554 |
| 3,688,278 | 8/1972 | Sauvan et al. | 364/900 |
| 3,725,650 | 4/1973 | Gelder | 364/514 |
| 3,795,909 | 3/1974 | Vehrs, Jr. | 342/65 |
| 3,808,410 | 4/1974 | Schlesinger | 364/401 |
| 3,974,481 | 8/1976 | Ledieu et al. | 364/402 |
| 4,196,474 | 4/1980 | Buchanan et al. | 364/461 |
| 4,210,962 | 7/1980 | Marsh et al. | 364/402 |
| 4,449,041 | 5/1984 | Girard | 235/412 |
| 4,459,663 | 7/1984 | Dye | 364/200 |
| 4,466,068 | 8/1984 | Degre et al. | 364/461 |
| 4,567,566 | 1/1986 | Araya et al. | 364/554 |
| 4,623,966 | 11/1986 | O'Sullivan | 364/461 |
| 4,797,839 | 1/1989 | Powell | 364/554 |

FOREIGN PATENT DOCUMENTS

| | | |
|---|---|---|
| 0173534 | 3/1986 | European Pat. Off. |
| 2266919 | 10/1975 | France . |
| 80-00199 | 2/1980 | PCT Int'l Appl. . |
| 1284421 | 8/1972 | United Kingdom . |
| 1317510 | 5/1973 | United Kingdom . |
| 1390397 | 4/1975 | United Kingdom . |
| 1502420 | 3/1978 | United Kingdom . |
| 2145256 | 3/1985 | United Kingdom . |

OTHER PUBLICATIONS

A. N. Mucciardi, "Self-Organizing Probability State Variable Parameter Search Algorithms for Systems that Must Avoid High-Penalty Operating Regions", IEEE Transactions on Systems, Man, and Cybernetics, Vol. SMC-4, No. 4, Jul. 1974, pp. 350–361.
Proceedings of the IEEE 1984 National Aerospace and Electronics Conference, Dayton, 21st-25th May 1984, vol. 1, pp. 510–515, IEEE, New York, U.S.: M. D. Olinger et al., "Tactical Flight Management: Threat Penetration Algorithm Design" p. 511, col. 2, lines 38–47; p. 512, col. 2, lines 15–32, Figure 1.
Proceedings of the IEEE 1984 National Aerospace and Electronics Conference, Dayton, 21st-25th May 1984, vol. 2, pp. 1308–1312, IEEE, New York, U.S.: T. B. Dissanayake et al.: "Real-Time Management of Strategic Penetrator Missions", p. 1309, col. 1, line 30–col. 2, line 17, Figures 1–2.
Proceedings of the IEEE 1984 National Aerospace and Electronics Conference, Dayton, 21st-25th May 1984, vol. 1, pp. 97–105, IEEE, New York, U.S.: G. O. Burnham: "Integrated Terrain Access/Retrieval System", p. 100, col. 1, lines 2–5; Figure 5.

Primary Examiner—Thomas G. Black
Attorney, Agent, or Firm—Cushman, Darby & Cushman

[57] ABSTRACT

Tactical routing apparatus e.g. for an aircraft comprises stores for storing data representing the geographical domain through which the aircraft is to pass and data representing the location and type of a plurality of threats (e.g. gun or missile sites), and a processor for determining and displaying on a V.D.U. the optimal route connecting two points and the probability of successfully completing the route.

6 Claims, 2 Drawing Sheets $T_x$ = THREAT N° x
$WP_y$ = WAYPOINT y
R = MAXIMUM RANGE OF THREAT
$X_n$ = OFFSET FROM THREAT n

TACTICAL ROUTING SYSTEM AND METHOD

This is a continuation of application Ser. No. 07/193,223, filed May 11, 1988, which was abandoned upon the filing hereof, which was a continuation of application Ser. No. 06/846,078 filed Mar. 31, 1986, now abandoned.

BACKGROUND OF THE INVENTION

1. Field of the Invention

This invention relates to a system and method for determining the probability of failing successfully to complete a mission following a predetermined route through a domain containing a series of threats. For convenience the system and method are referred to herein as a tactical routing system and method.

2. Description of the Prior Art

A tactical routing system finds application, for example, in military aircraft, where it is a great importance for the pilot and his ground controller to be able to estimate with a reasonable degree of accuracy the probability of the aircraft being flown from a base to a target and back to base over hostile territory without the aircraft being destroyed by a ground based missile or gun site. The advent of sophisticated radar and intelligence systems such as those described in our joint European Published Application No. 0173534 now make it possible to locate and identify the nature of a threat in the domain over which the aircraft is to fly. However, although this information may be supplied to the pilot of the aircraft, his very high workload makes it impossible for him to make an accurate assessment of the magnitude of the threat posed by any particular missile or gun site. Still less is he able to predict with accuracy the compound effect of all of the gun and missile sites within range of his path and consequently the probability of failing to reach his desired target without destruction of the aircraft. For convenience, the probability of the pilot failing to survive a given threat is herein termed the "kill probability" and the probability of failing to complete a mission is herein termed the "accumulated kill probability". The term "domain" is used herein to define that geographic region which contains the start and end points of the mission and which is sufficiently large to include any ground based threat which may influence the accumulated kill probability.

In addition to being unable to predict the accumulated kill probability of a particular route, the pilot is also unable to optimize the route taken between the start and end points, and thus the pilot's choice of route may often result in an unacceptably high accumulated kill probability.

Consequently, there exists a need for a tactical routing system which can determine and display a route having an optimal survival probability for an aircraft flying to a target and passing over hostile territory. In addition, since in a military scenario the location and capability of certain of the ground based threats (gun or missile sites) may only be fully determined during the mission, there is also a need for a tactical routing system in which fresh information regarding threats may be supplied to the system to form a rapid update of the optimal route. In this specification, the term "an optimal route" is used to mean a route having a relatively low associated accumulated kill probability, and it is not necessarily the best possible route.

SUMMARY OF THE INVENTION

In view of the above-noted needs in the prior art, according to one aspect of this invention there is provided a tactical routing apparatus for determining the probability of a vehicle failing to reach an end point from a start point by maneuvering a selected route connecting the start point and end point in a domain containing a predetermined distribution of threats, the apparatus including:

(i) map store means for storing data representing positional information of at least the distribution of threats within the domain, (ii) data base means for storing data representing a threat profile of each of a plurality of types of threat, (ii) input means for inputting into the map store means data representing the start and end points and data representing the location of threats and identifying the type of threats, (iv) processor means for processing data from the map store means and data base means so as to determine the probability of the vehicle failing to reach the end point along the selected route in the domain, (v) display means for displaying the selected route, and (vi) display means for displaying the probability of the vehicle failing to reach the end point along the selected route.

In accordance with another aspect of this invention, there is provided a method of determining the probability of failing to reach an end point from a start point by maneuvering along a selected route through a domain containing a predetermined distribution of threats, the method comprising the steps of:

(i) dividing the selected route into a plurality of straight line segments, (ii) determining the probability of failing to survive given threats encountered along each of the segments in turn by considering the length of each straight line segment and the proximity of the line segment to the threats in the domain, (iii) combining the probabilities of failing to survive the given threats for each line segment of the selected route so as to determine the probability of the vehicle failing to reach the end point along the path connecting the segments of the selected route, (iv) displaying the probability of the vehicle failing to reach the end point along the selected route in the domain, and (v) displaying the selected route in relation to the domain.

In accordance with yet a further aspect of this invention, there is provided a method of determining an optimal route for a vehicle which minimizes the probability of the vehicle succumbing to a threat, the optimal route being through a domain containing a predetermined distribution of threats, the method comprising the steps of:

(i) selecting an initial arbitrary route having a start point, an end point, and connecting a selected number of waypoints, (ii) determining the probability of the vehicle failing to complete the initial arbitrary route from the start point to the end point, (iii) storing the determined probability of the vehicle failing to complete moving each of the waypoints in turn in a given direction to determine a local preferred position for each waypoint in terms of the lowest probability of the vehicle failing to survive given threats associated with path segments to either side of the waypoint, and then determining the probability failing to complete the route connecting each of the local preferred waypoints, the start point and end points being connected by the preferred waypoints to obtain the optimal route, (v) displaying the optimal route selected, and (vi) displaying the probability of the vehicle failing to complete the optimal route.

In a preferred embodiment of the above method, the movement of the waypoints is repeated in a direction at an angle to the direction of a prior movement so as to obtain an improved optimal route together with the probability of the vehicle failing to complete the improved optimal route.

BRIEF DESCRIPTION OF THE DRAWINGS

Further aspects of the invention will become apparent from the following description of an example of a tactical routing system in which reference will be made to the accompanying drawings in which.

DETAILED DESCRIPTION OF THE PREFERRED EMBODIMENT

Figure 1:
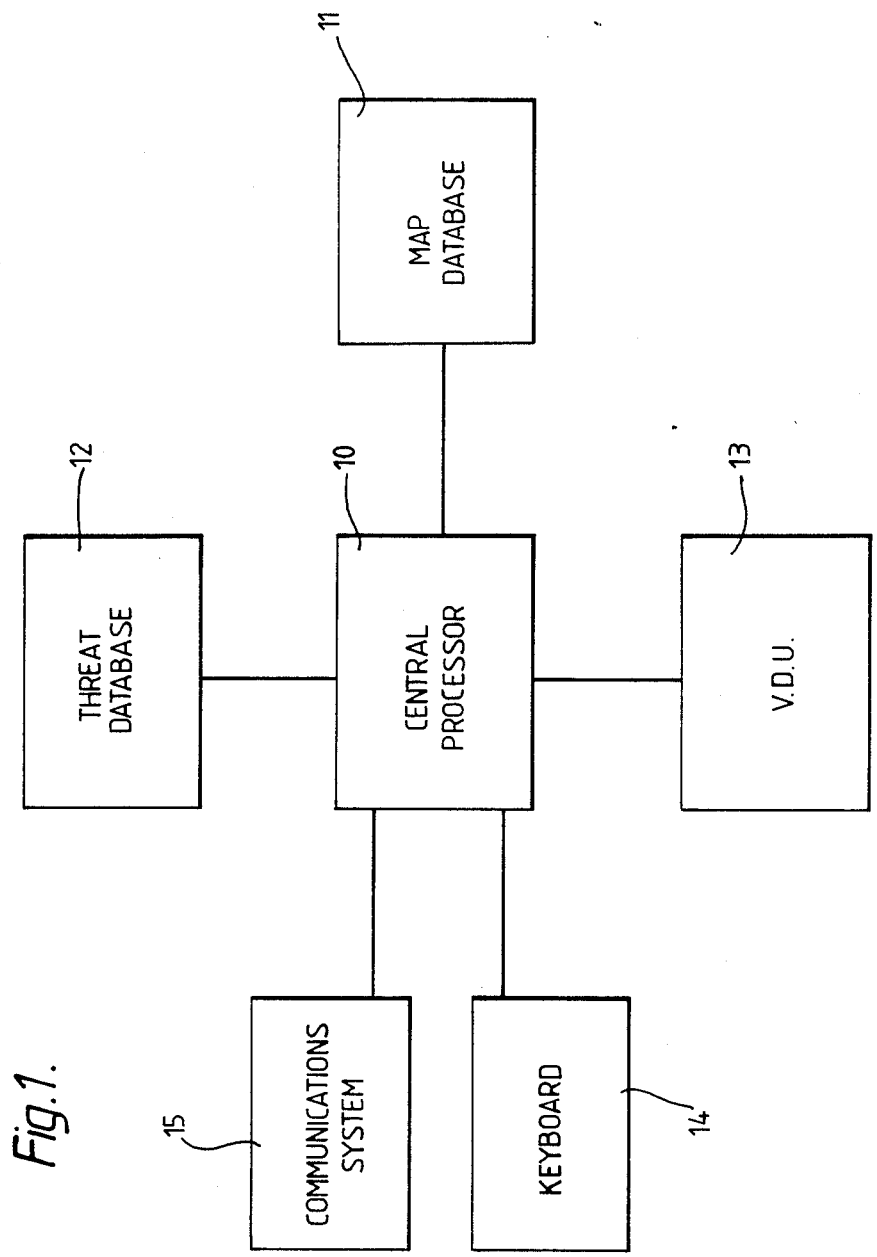
FIG. 1 is a schematic view of a tactical routing system for use on board an aircraft.

The system to be described below with reference to FIG. 1 is an aircraft tactical routing aid for advising a pilot flying over territory containing known threats, of the accumulated kill probability associated with his intended route. In addition, the system also is operable to advise the pilot of an optimal route to his intended target so as to reduce the associated accumulated kill probability to a relatively low level. The system also allows a rapid revision of the relevant probability and the optimal route should the number or location of the known threats change, or should the location of the intended end point of the route be changed.

The system comprises a central processor 10 and a map database 11 which, prior to start of the mission, is programmed with data representing positional information concerning the domain over which the aircraft is to fly. Such data includes the location of the pilot's home base, the location of each target with respect to the base, the geographical location of each threat which is known to exist at the start of the mission, and data identifying the type of threat.

The system further includes a threat data base 12 which stores data representing for each type of known threat its threat profile. By way of background, for each individual threat, the kill probability is defined as a function of the distance of closest approach of a straight line path to a fixed point representing the origin of the threat. Each type of threat has a maximum range over which it can act, and a profile is determined for the kill probabilities encountered along straight line paths at offsets from the threat origin. It is assumed that the kill probability accumulates uniformly across the section of the path within the overall range of the threat. Thus, for each path segment the kill probability due to a particular threat is a function of the offset of the path segment from the threat origin and the length of the path segment within the overall range of the threat origin as shown in FIG. 3. For each threat, the threat data base contains information relating the kill probability to the offset for each of a number of values of offset from the threat origin. An example of a threat profile is illustrated graphically in FIG. 2. In the present system, each threat is assumed to have a circular threat profile located concentrically with the threat origin (see FIG. 3); however, the system may be adapted to reflect a non-circular threat profile.

The central processor 10 determines, in a manner to be described below, the accumulated kill probability associated with a particular route under consideration. This route may be an intuitive guess by the pilot, a straight line connecting the required beginning and end points, or the previous optimal route, etc. The optimal route is then displayed on a video display unit (V.D.U.) 13 together with the value of the associated accumulated kill probability. The processor 10 when instructed accordingly may also display an improved route within parameters set by the pilot together with the associated accumulated kill probability of that route.

The system also includes a keyboard 14 for enabling the pilot to enter data relating to the parameters within which he wishes the system to operate, for example, the number of straight line segments constituting the path connecting the base and the target, the location of the particular target, the degree of fineness of the optimization route, details of changes in location and nature of threats, etc.

The system also includes a communications input 15 which allows information to be fed directly from the aircraft communications system to update the domain map store 11. This information may, for example, concern the nature of the threats, a change in position of the target, or validation of a suspected threat. The system continually reviews the optimal route and its associated accumulated kill probability and may be interrogated by the pilot to determine the most recent optimal route and its associated accumulated kill probability.

The method of calculation of the probability of mission success attached to a particular route will now be described in detail. In the present embodiment it is assumed that the aircraft flies at uniform height and uniform speed and that the threats under consideration have circular threat contours based on the relevant threat origin. In this method, the kill probabilities due to individual threats in the domain are accumulated. Starting from the initial point (which represents base or the pilot's present position), each line segment is considered in turn, each line segment being considered as a section of an infinite straight line. Thus, the kill probability on the line segment from each threat may be calculated. Each probability of each segment is combined to produce a combined kill probability, and when all line segments and threats have been considered, this gives the accumulated kill probability.

In this method, the route is divided into a plurality of straight line segments connecting "waypoints" located in the domain under consideration. The term "offset" refers to the distance of closest approach of an infinite straight line to the origin of a particular threat, and it determines the kill probability of a particular threat. Each line segment is assessed in turn to determine whether it is in the range of one or more threats, and if so, the offset from each threat is determined and the associated kill probability retrieved from the threat data base means so that the combined kill probability for that line segment can be determined. Once this assessment has been carried out for all the line segments, the kill probabilities are accumulated to obtain the accumulated kill probability, the order of accumulation being unimportant as each threat is considered to act independently. The probabilities are accumulated according to the relation:

$$P_k = P_k' + (1 - P_k') \quad (I)$$

where $P_k$ is the accumulated kill probability resulting from a consideration of $i-1$ sections of path in relation to all threats and the ith section of the path due to i threats, $P_k'$ is the accumulated kill probability resulting from a consideration of $i-1$ sections of path in relation to all threats and the ith section of the path due to $j-1$ threats, and i and j are integers in the range $i = 1$ to N and $j = 1$ to M, respectively, where N is the total number of path segments and M is the total number of threats.

Referring now to FIG. 3, an example of the calculation of the accumulated kill probability for two line segments running between three waypoints in a region containing three threats of the same type will be described, the following notation being used:

$P_k$ = accumulated kill probability at each step of the calculation.

$P_{ii}$ = kill probability on the $i^{th}$ section of path due to the $j^{th}$ threat.

Figure 2:
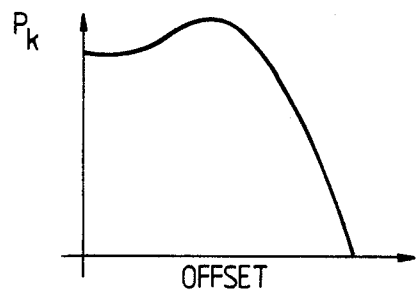
FIG. 2 is a schematic diagram illustrating the threat profile of a threat.
Figure 3:
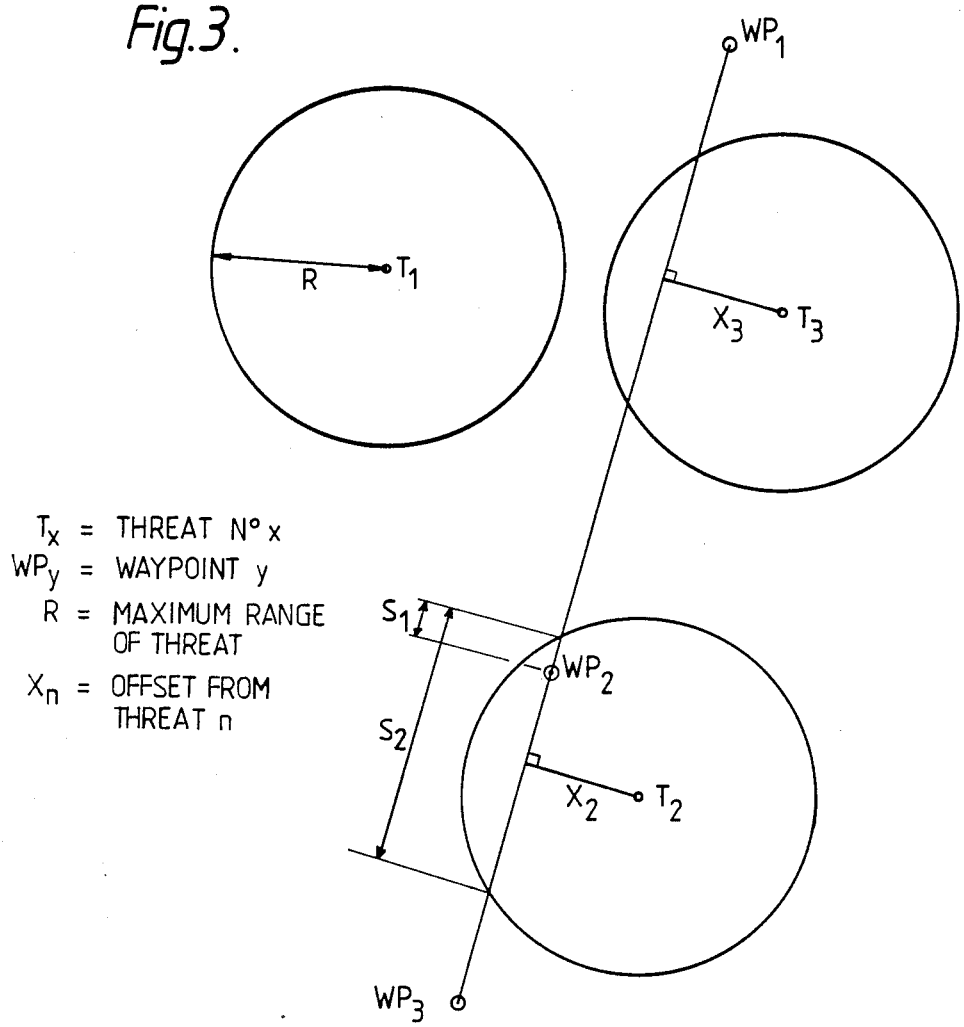
FIG. 3 is a schematic representation of a route connecting three waypoints in the vicinity of three threats.

$f(x)$ = a function, dependent on the closest approach distance of a line segment to a threat center, for modifying a kill probability value for that threat as stored in the threat data base (an example of such a function $f(x)$ is shown in FIG. 2).

$g(a,b,p)$ a function dependent on the length 'a' of a line segment falling within the threat profile of a threat, the length 'b' of the overall route falling within the threat profile of the threat, and the kill probability 'p' of that threat, for modifying a kill probability value for that threat as stored in the threat database.

Referring to the first line segment connecting waypoint WP1 to waypoint WP2 and using relation (1) specified above to accumulate the probabilities:

$p_{11} = 0.0 => P_k = 0.0$
$p_{12} = g(s_1, s_2, f(x_2)) => P_k = p_{12}$
$p_{13} = f(x_3) => P_k = p_{12} + p_{13} - p_{12}p_{13}$

Now considering the line segment connecting waypoint WP2 to waypoint WP3

$p_{21} = 0.0 => P_k = p_{12} + p_{13} - p_{12}p_{13}$
$p_{22} = g((s_2 - s_1), s_2, f(x_2)) => P_k$
$= p_{12} + p_{13} + p_{22} - p_{11}p_{13} - p_{12}p_{22} - p_{13}p_{22} + p_{12}p_{13}p_{22}$
$P_{23} = 0.0$

Therefore, for the line segment from waypoint WP1 to WP3 via WP2,
Total $P_k = p_{12} + p_{13} + p_{22} - p_{12}p_{13} - p_{12}p_{22} - p_{13}p_{22} + p_{12}p_{13} \cdot p_{22}$ This process is repeated so that ultimately an accumulated kill probability is determined for the entire route under consideration. The accumulated kill probability is then displayed on the V.D.U. 13 together with an indication of the geographic layout of the route.

The method of optimization implemented by the system to find an optimal route between a start point and an end point and passing via a selected number of waypoints will now be described.

Parameters are fed into the system concerning the start and end points, the location and nature of any known threats in the domain, the number of waypoints allowable, overall constraints such as total path length, and details concerning the degree of optimization to be implemented by the system. These latter optimization details will be understood from a consideration of the optimization method.

The system is provided with an initial route connecting the start and end points and comprising a series of straight line segments interconnecting the waypoints. The route may be a previous optimal route, the pilot's own intuitive best route, or a straight line connecting the start and end points which is subdivided into equal length segments by means of the waypoints. The accumulated kill probability associated with this initial route is determined as described above and stored, together with data representing this initial route.

An optimal waypoint position routine is then implemented by means of an algorithm contained in the central processor, in which each of the waypoints in turn is moved incrementally to either side of its original position in a given direction, and the kill probability accrued by each line segment connected to the waypoint is evaluated to enable that position of the waypoint to be selected which has the lowest associated kill probability. Mention was made above of the details concerning the fineness of optimization required to be implemented. Such details include the size and number of the increments by which each waypoint is to be moved. Examples of algorithms which may be used to effect this movement will be apparent to those skilled in the art.

The optimal waypoint position routine is continued until all the waypoints have been moved in the given direction to find the optimal incremental position of all the waypoints. This then completes a course optimization of the route, representing data of which may be stored together with the associated accumulated kill probabilities. The optimal waypoint position routine is then repeated in a similar manner as before except that the waypoint are now moved route, the pilot's own intuitive best route, or a straight line connecting the start and end points which is subdivided into equal length segments by means of the waypoints. The accumulated kill probability associated with this initial route is determined as described above and stored, together with data representing the initial route.

An optimal waypoint position routine is then implemented by means of an algorithm contained in the central processor, in which each of the waypoints in turn is moved incrementally to either side of its original position in a given direction, and the kill probability accrued by each line segment connected to the waypoint is evaluated to enable that position of the waypoint to be selected which has the lowest associated kill probability. Mention was made above of the details concerning he fineness of optimization required to be implemented. Such details include the size and number of the increments by which each waypoint is to be moved. Examples of algorithms which may be used to effect this movement will be apparent to those skilled in the art.

The optimal waypoint position routine is continued until all the waypoints have been moved in the given direction to find the optimal incremental position of all the waypoints. This then completes a course optimization of the route, representing data of which may be stored together with the associated accumulated kill probabilities. The optimal waypoint position routine is then repeated in a similar manner as before except that the waypoints are now moved in a direction at an angle (usually perpendicular) to the direction of the first movement, thereby to obtain an improved optimal route and its associated accumulated kill probability. It is envisaged that in this routine the number and size of the increments are the same as used in the first optimal waypoint position routine. The optimal waypoint position routine may be repeated yet again but in a direction at an angle to the previous movement (usually parallel to the first perturbation) and with a reduced increment size to obtain a further improved optimal route, representing data of the route and its associated kill probability being displayed to the pilot.

In the above system each routine of movements is carried out in linear fashion, i.e., in one direction and in equal increments. It is, however, possible to arrange for the movements to be non-linear, for example, to take into account the amount of fuel burned.

The system continually updates the optimal route to take into account the actual position of the aircraft and changes in the threats present in the domain. Thus, for example, if during the mission the system receives information via the aircraft communication system that a previously unknown threat has been identified as being of a certain type and lying along the optimal route, the system will cause the displayed optimal route to deviate from the new threat thereby to maintain a low accumulated kill probability.

We claim:

1. A method of determining the probability of a vehicle failing to reach an end point from a start point by maneuvering along a selected route between the start point and end point through a domain containing a predetermined distribution of threats, said method comprising the steps of:
   (i) dividing said selected route into a plurality of straight line segments,
   (ii) determining the probability of failing to survive given threats encountered along each of said segments in turn having regard to a length of each straight line segment and the proximity of the line segment to said threats in the domain,
   (iii) combining the probabilities of failing to survive the given threats for each line segment of the selected route so as to determine the probability of the vehicle failing to reach the end point along the path connecting the segments of the selected route,
   (iv) displaying said probability of the vehicle failing to reach the end point along the selected route in the domain, and
   (v) displaying said selected route in relation to said domain.

2. A method of determining an optimal route for a vehicle which minimizes the probability of the vehicle succumbing to a threat, the optimal route being through a domain containing a predetermined distribution of threats, said method comprising the steps of:
   (i) selecting an initial arbitrary route having a start point, an end point, and connecting a selected number of waypoints,
   (ii) determining the probability of the vehicle failing to complete said initial arbitrary route from said start point to said end point,
   (iii) storing said determined probability of the vehicle failing to complete said initial arbitrary route,
   (iv) moving each of said waypoints in turn in a given direction to determine a local preferred position for each waypoint in terms of the lowest probability of the vehicle failing to survive given threats associated with path segments to either side of the waypoint, and then determining the probability of the vehicle failing to complete the route connecting each of said local preferred waypoints, the start and end points being connected by the preferred waypoints to obtain said optimal route,
   (v) displaying the optimal route obtained, and
   (vi) displaying the probability of the vehicle failing to complete said optimal route.

3. A method according to claim 2, wherein the movement of the waypoints is repeated in a direction at an angle to the direction of a prior movement so as to obtain an improved optimal route together with the probability of the vehicle failing to complete the improved optimal route.

4. An apparatus for determining a probability of a vehicle failing to reach an end point from a start point by maneuvering along a selected route between the start point and end point through a domain containing a predetermined distribution of threats, comprising:
   processing and data base means for (i) dividing said selected route into a plurality of straight line segments, (ii) determining a probability of failing to survive given threats encountered along each of said segments in turn having regard to a length of each straight line segment and a proximity of the line segment to said threats in the domain, and (iii) combining the probabilities of failing to survive the given threats for each line segment of the selected route so as to determine the probability of the vehicle failing to reach the end point along the path connecting the segments of the selected route; and
   display means for displaying said probability of the vehicle failing to reach the end point along the selected route in the domain, and displaying said selected route in relation to said domain.

5. An apparatus for determining an optimal route for a vehicle which minimizes the probability of the vehicle succumbing to a threat, the optimal route being through a domain containing a predetermined distribution of threats, comprising:
   data base and processing means for:
   (i) selecting an initial arbitrary route having a start point, an end point, and connecting a selected number of waypoints,
   (ii) determining a probability of the vehicle failing to complete said initial arbitrary route from said start point to said end point,
   (iii) storing said determined probability of the vehicle failing to complete said initial arbitrary route, and
   (iv) moving each of said waypoints in turn in a given direction to determine a local preferred position for each waypoint in terms of a lowest probability of the vehicle failing to survive given threats associated with path segments to either side of the waypoint, and then determining the probability of the vehicle failing to complete the route connecting each of said local preferred waypoints, the start and end points being connected by the preferred waypoints to obtain said optimal route, and
   displaying the optimal route obtained, and displaying the probability of the vehicle failing to complete said optimal route.

6. An apparatus according to claim 5, wherein the movement of the waypoints is repeated in a direction at an angle to the direction of a prior movement so as to obtain an improved optimal route together with the probability of the vehicle failing to complete the improved optimal route.

* * * * *